United States Patent
Pitzer

[11] Patent Number: 5,885,545
[45] Date of Patent: *Mar. 23, 1999

[54] HIGHLY TRANSPARENT, YELLOW IRON OXIDE PIGMENTS, PROCESS FOR THE PRODUCTION THEREOF AND USE THEREOF

[75] Inventor: Ulrike Pitzer, Krefeld, Germany

[73] Assignee: Bayer Ag, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 530,626

[22] Filed: Sep. 20, 1995

[30] Foreign Application Priority Data

Sep. 30, 1994 [DE] Germany ............... 44 34 969.6

[51] Int. Cl.⁶ .................................................. C01G 49/02
[52] U.S. Cl. ..................... 423/632; 423/633; 106/456
[58] Field of Search .................. 423/150.1, 632, 423/633; 106/456

[56] References Cited

U.S. PATENT DOCUMENTS

| | | | |
|---|---|---|---|
| 2,558,303 | 6/1951 | Marcot et al. .......................... | 423/632 |
| 2,558,304 | 6/1951 | Marcot et al. .......................... | 423/633 |
| 2,904,402 | 9/1959 | Cauterman .............................. | 423/632 |
| 3,619,137 | 11/1971 | Ratchiffe ................................ | 423/633 |
| 3,867,516 | 2/1975 | Bodson .................................. | 423/632 |
| 4,348,240 | 9/1982 | Patil et al. .............................. | 106/304 |
| 4,758,415 | 7/1988 | Patil ....................................... | 423/150.1 |
| 5,451,253 | 9/1995 | Klingelhoefer et al. ............... | 423/632 |
| 5,614,012 | 3/1997 | Pitzer .................................... | 423/633 |
| 5,650,131 | 7/1997 | Lown et al. ............................ | 423/632 |

FOREIGN PATENT DOCUMENTS

| | | | |
|---|---|---|---|
| 36 40 245 | 5/1988 | Germany . | |
| 53-73497 | 6/1978 | Japan ..................................... | 423/632 |
| 63-222019 | 9/1988 | Japan ..................................... | 423/632 |
| 22 71 766 | 4/1994 | United Kingdom . | |

OTHER PUBLICATIONS

Abstract of JP 62–036026, Feb. 1987.

*Primary Examiner*—Ngoc-Yen Nguyen
*Attorney, Agent, or Firm*—Connolly & Hutz

[57] ABSTRACT

The present invention relates to a process for the production of yellow, highly transparent iron oxide pigments of elevated chemical purity, to yellow iron oxide pigments obtainable in this manner and to the use thereof to color lacquers and plastics.

7 Claims, No Drawings

12# HIGHLY TRANSPARENT, YELLOW IRON OXIDE PIGMENTS, PROCESS FOR THE PRODUCTION THEREOF AND USE THEREOF

FIELD OF THE INVENTION

The present invention relates to a process for the production of yellow, highly transparent iron oxide pigments of elevated chemical purity, to yellow iron oxide pigments obtainable in this manner and to the use thereof for colouring lacquers and plastics.

BACKGROUND OF THE INVENTION

Iron oxide pigments having an average particle size of less than 0.1 μm are described as transparent iron oxide pigments as they transmit visible light. As an alternative to the particle size, the specific surface area is often used as a measure of the size of the particles. In particular in the case of acicular particles, this measure avoids stating particle sizes in various dimensions. In this manner, powders having BET specific surface areas of over 80 $m^2/g$ may be described as transparent. Highly transparent pigments are those having specific surface areas of at least 100 $m^2/g$.

Transparent iron oxide pigments are principally used in the production of automotive effect lacquers, wood varnishes and for colouring transparent plastics.

Transparent yellow iron oxide pigments are generally synthesised by precipitation of iron(II) hydroxides or carbonates in an acidic or alkaline pH range and subsequent oxidation to Fe(III) oxidehydroxides. The precipitation of yellow α-FeOOH in an alkaline pH range is described in U.S. Pat. No. 2,558,303 and U.S. Pat. No. 2,558,304.

While production with an alkali excess does indeed give rise to products which are low in salt and are thus more readily dispersible, it does, however, have the disadvantage that many other hydroxides of metal ions, which are present as impurities in iron salt solutions used industrially, are coprecipitated in addition to the iron hydroxides. The precipitation of Mn impurities may in particular be cited. These impurities cause dirty, greenish hues in the yellow pigments and brownish hues in the red pigments obtained from the yellow pigments by calcination. Moreover, depending upon the particular raw material, the total content of metallic impurities may be so high that these pigments may no longer be used, for example, in plastic packaging for foodstuffs.

The production of α-FeOOH pigments in an acidic pH range has the advantage that the precipitation of foreign metal impurities is avoided, but, on the other hand, has the disadvantage that, even after vigorous washing, the pigments are still heavily contaminated with anions. Since production is generally performed on the basis of iron sulphate solutions, sulphate impurities may in particular be cited. This leads, both in the yellow pigments and the red pigments obtained therefrom by calcination, to impaired dispersibility and thus, with the same dispersion energy input, to poorer transparency in comparison with pigments produced under alkaline conditions.

U.S. Pat. No. 4,758,415 describes a process for the removal of soluble metal cations from iron oxide pigments. In this process, transparent yellow iron oxide pigments produced using an acidic precipitation process are washed with a solution containing a ligand compound, wherein the conductivity of the pigment is very low after treatment. This process cannot, however, remove metal impurities which are firmly incorporated into the pigment, which occur, for example, when the pigments are produced using alkaline precipitation processes. Ammonia is cited as a ligand compound, in addition to many other compounds. The described post-treatment of pigments with ammonia does, however, have various disadvantages. Thus, for example, on toxicity grounds it is hardly possible to wash filter cakes with ammonia on a large industrial scale. Moreover, when filter cakes are washed on a large industrial scale, it cannot be ensured that the entire product cross-section comes into contact with a sufficient quantity of and for a sufficient time with the ligand compound, such that uniform product quality cannot be achieved.

U.S. Pat. No. 4,758,415 furthermore describes pretreatment of yellow pigments produced under acidic conditions before washing with the ligand compounds as described above, by adding NaOH to the production suspension with simultaneous oxidation. This alkalisation of the production slurry does, however, have the disadvantage that many metallic impurities still contained in the suspension from the raw material are still coprecipitated, in a similar manner as in the precipitation process in an alkaline pH range.

SUMMARY OF THE INVENTION

The object of the invention was thus to provide yellow, highly transparent iron oxide pigments which are chemically pure and thus very pure in colour and which do not exhibit the stated disadvantages of hitherto known pigments and industrial processes.

It has been found that comparatively very readily dispersible, highly transparent, yellow iron oxide pigments may also be produced using a precipitation process in an acidic pH range. These pigments differ from hitherto known highly transparent yellow pigments in that they are chemically pure.

The present invention also provides a process for the production of highly transparent, chemically pure, yellow iron oxide pigments, wherein a) yellow, highly transparent iron oxide pigments of the α-FeOOH modification are produced by precipitation and oxidation processes, starting from aqueous iron(II) sulphate solutions, in such a manner that on completion of pigment formation the pH value is below 6, preferably less than or equal to pH 5 and b) the resultant yellow pigments or pigment filter cakes are subjected to post-treatment with sodium hydroxide solution.

DESCRIPTION OF THE PREFERRED EMBODIMENTS

Production of the yellow, highly transparent intermediates in an acidic environment is prior art. Production preferably proceeds by introducing an industrial grade iron(II) sulphate solution into a vessel, precipitating iron(II) hydroxides or carbonates from this by adding alkaline precipitants and optionally nucleation modifiers and oxidising these hydroxides or carbonates to iron(III) oxidehydroxides. The temperature selected during precipitation should be as low as possible in order to obtain very finely divided yellow pigments; the temperature is preferably between 15° C. and 45° C. NaOH is preferably used as the alkaline precipitant. Other alkaline precipitants, such as $Na_2CO_3$, $NH_3$, MgO and/or $MgCO_3$, may however also be used without any problem. It is also possible additionally to add nucleation modifiers in order to increase the fineness of the pigments. Examples which may be cited are phosphates, metaphosphates or hydroxycarboxylic acids. The oxidation from divalent to trivalent iron is preferably performed with air. Vigorous aeration is advantageous during oxidation.

Once the initially formed pigment has been filtered or allowed to settle and washed, the filter paste is preferably resuspended in sodium hydroxide solution. Pigment concentration during resuspension is particularly preferably 10 to 60 g/l. The concentration of the sodium hydroxide solution should be selected such that the pH value of the suspension is between pH 10 and pH 14. The pigment is advantageously stirred in this suspension until the saline impurities have dissolved off the surface. Times of between 15 minutes and 2 hours are sufficient for this purpose. The temperature may be selected at will between room temperature and boiling point. The NaOH post-treatment is, however, preferably performed at room temperature. After the NaOH post-treatment, the pigment is filtered, dried and optionally ground.

The sodium hydroxide solution post-treatment may also be performed on dried, highly transparent iron oxide pigments. Good dispersion of the pigment in the sodium hydroxide solution must be ensured. It is also possible to improve pigment properties by washing the initially produced filter cake with sodium hydroxide solution; irregularities in product quality must, however, be expected as, at least on a fully industrial scale, relatively high costs are inevitably entailed by arranging washing in such a manner that all parts of the product come uniformly into contact with sodium hydroxide solution.

The pigment obtained after treatment with sodium hydroxide solution, which pigment is provided by the present invention, consists of $\alpha$-FeOOH with a low content of metallic impurities, in particular a low Mn content of less than 0.10 wt. % and a low content of anionic impurities, in particular a low sulphate content of less than 1.2 wt. %. Lacquer coatings of the pigment according to the invention dispersed in a lacquer applied onto a chess board pattern exhibit elevated transparency and a saturated, bright yellow hue. Particular emphasis should be placed upon the distinctly improved transparency in comparison with the pigment which has not been post-treated. This is extraordinarily surprising as the specific surface area of the pigments, which is generally also used as an index of transparency, is sometimes considerably reduced by the NaOH post-treatment and lower transparency would thus in fact have been expected instead.

Plastics, as well as lacquers, may also be coloured with the pigment. Due to their low content of impurities, the pigments are in particular suitable for colouring plastics for foodstuffs packaging. The present invention thus also provides the use of the pigments according to the invention to colour lacquers and plastics.

In order to determine the Mn content, the samples are completely dissolved and the manganese contents then ascertained by emission spectrometry.

Sulphate contents are determined using the following method: the samples are combined with a vanadium pentoxide/iron powder mixture as a flux and heated to above 1,200° C. in a stream of oxygen. The resultant gases are investigated for their sulphur dioxide content using an infra-red measuring cell. The content ascertained in this manner is recalculated as sulphate.

The specific BET surface area is determined using the $N_2$ single point method to DIN 66 131.

The following examples describe the production of the highly transparent, chemically pure, yellow iron oxide pigments according to the invention. The examples are intended to illustrate the invention and do not constitute a limitation.

EXAMPLES

Example 1

50 kg of tartaric acid together with 6.3 $m^3$ of NaOH solution with an NaOH content of 286 g/l were stirred into 57.5 $m^3$ of an iron sulphate solution with an $FeSO_4$ content of 150 g/l at a temperature of 34° C. The pH value was pH 7.4 immediately after addition of the NaOH. The mixture was then aerated with 1,050 $m^3$/h of air until the pH value had fallen to pH 3.3. The suspension was filtered and washed until free of salt. The specific surface area of the pigment produced in this manner is 150 $m^2$/g. The Mn content is 0.02 wt. % and the sulphate content 3.5 wt. %. 2,600 g of filter paste of the pigment produced using the above process with a solids content of 38.4 wt. % of FeOOH were resuspended in 25 liters of 0.2N NaOH. The FeOOH content of the suspension was approximately 40 g/l. The temperature was 29° C. The suspension was stirred for one hour, filtered, washed until free of salt and the pigment dried. The specific surface area of the post-treated pigment is 126 $m^2$/g. The Mn content is 0.02 wt. % and the sulphate content 0.61 wt. %.

Lacquer coatings of the treated and untreated pigment dispersed in a lacquer applied onto a black and white card show that post-treatment has given rise to a clearly visible increase in transparency.

In order better to illustrate the properties of the product, the analytical values are compared in table 1 with commercial products Sicotrans L1915 and L1916 (products of BASF), Cappoxyt 4214X (product of Cappelle) and Transoxide yellow 10-30-AC-0553 (product of Hilton Davis).

Example 2

318.5 g of filter paste of a pigment produced as in example 1 having a solids content of 31.8 wt. % of FeOOH were resuspended in 2 liters of 0.2N NaOH solution. The FeOOH content of the suspension was approximately 50 g/l. The suspension was heated to 80° C., stirred for one hour, filtered, washed until free of salt and dried. The specific surface area of the post-treated pigment was 106 $m^2$/g. The Mn content is 0.02 wt. %, the sulphate content 0.69 wt. %. Lacquer coatings of the treated and untreated pigment dispersed in a lacquer applied onto a black and white card show that post-treatment has given rise to a clearly visible increase in transparency. The analytical results are shown in table 1.

Example 3

15 liters of an $FeSO_4$ solution with an $FeSO_4$ content of 150 g/l were combined with 34.6 g of a 57% glycolic acid solution and adjusted to a temperature of 28° C. 2.8 kg of NaOH solution with an NaOH content of 25.4 wt. % were added within 20 minutes while the mixture was stirred and perfused with nitrogen. The pH value was pH 7.3, after addition of the NaOH. The mixture was then aerated with a quantity of 800 l/h of air until the pH had fallen to 3.6. Further NaOH solution was then apportioned with simultaneous oxidation, wherein addition was controlled in such a manner that the pH value was maintained at less than or equal to pH 5. Once the $FeSO_4$ content of the solution had fallen to less than or equal to 2 g/l, the addition of NaOH and oxidation were ended. The pigment was filtered out, washed until free of salt and dried.

The specific surface area of the pigment produced in this manner is 165 $m^2$/h. The Mn content is 0.05 wt. % and the sulphate content 2.9 wt. %.

25 g of the pigment produced in this manner were resuspended in 1 liter of 0.2N sodium hydroxide solution and stirred for 1 hour at room temperature. The pH value of the suspension was 13.3. The post-treated pigment was filtered out, washed and dried. The specific surface area was determined at 147 m²/g, the manganese content at 0.05 wt. % and the sulphate content at 0.55 wt. %. The values are shown in table 1.

Example 4

(Comparative Example)

A highly transparent pigment was produced as described in example 3. However, the quantity of NaOH added was such that the pH value at the end of the reaction was pH 7. The pigment was filtered and washed until free of salt.

162 g of pigment filter paste with an FeOOH content of 30.8 wt. % were resuspended in 888 ml of water. The suspension had an FeOOH content of approximately 50 g/l. 12 ml of a 45% NaOH solution were added to the suspension. The suspension was stirred for one hour at room temperature and the pigment then filtered out, washed and dried.

The specific surface area is 151 m²/g, the manganese content 0.15 wt. % and the sulphate content 0.49 wt. %. This means that, since the pH value was above pH 6 on completion of oxidation, manganese was coprecipitated. The values are also shown in table 1.

TABLE 1

| Product | BET surface area (m²/g) | Mn content (wt. %) | SO₄ content (wt. %) |
| --- | --- | --- | --- |
| Sicotrans L 1915 | 112 | 0,04 | 2,9 |
| Sicotrans L 1916 | 100 | 0,21 | 1,25 |
| Cappoxyt 4214 x | 113 | 0,12 | 1,06 |
| Transoxide-Yellow | 111 | 0,04 | 3,4 |
| Example 1 | 126 | 0,02 | 0,61 |
| Example 2 | 106 | 0,02 | 0,61 |
| Example 3 | 147 | 0,05 | 0,55 |
| Example 4 = counterexample to 3 | 151 | 0,15 | 0,49 |

What I claim is:

1. A process for the production of highly transparent yellow iron oxide pigments consisting essentially of the α-FeOOH modification, comprising:

a) producing yellow, highly transparent iron oxide pigments by precipitation from an aqueous iron (II) sulfate solution, followed by oxidation, in such a manner that on completion of pigment formation the ph value is less than or equal to 5;

b) washing the precipitated pigments until free of salt, and post-treating the resultant yellow pigments at room temperature in dry or filter cake form with sodium hydroxide solution at a pH between 10 and 14.

2. A process according to claim 1, wherein the NaOH post-treatment is carried out in suspension with a pigment content of 10 to 60 g/l.

3. A process according to claim 2, wherein the NaOH post-treatment is performed with stirring for 15 minutes to 2 hours.

4. A process for the production of yellow iron oxide pigments of the α-FeOOH modification, comprising:

a) producing yellow iron oxide pigments by precipitation and oxidation from an aqueous iron (II) sulphate solution, such that on completion of pigment formation the pH value is below 6; and b) washing the precipitated pigments until free of salt, and post-treating the resultant yellow pigments at room temperature in dry or filter cake form with sodium hydroxide solution at a pH between 10 and 14.

5. A process for the production of yellow iron oxide pigments of the α-FeOOH modification, comprising:

a) producing yellow iron oxide pigments by precipitation and oxidation from an aqueous iron (II) sulphate solution, such that on completion of pigment formation the pH value is below 6; and b) washing the precipitated pigments until free of salt, and post-treating the resultant yellow pigments in dry or filter cake form with sodium hydroxide solution at a pH between 10 and 14.

6. The process of claim 5, wherein said post-treating the resultant yellow pigments in dry or filter cake form with sodium hydroxide solution at a pH between 13.3 and 14.

7. The process of claim 5, wherein said post-treating the resultant yellow pigments in dry or filter cake form with sodium hydroxide solution at a pH between 10 and 13.3.

* * * * *